UNITED STATES PATENT OFFICE.

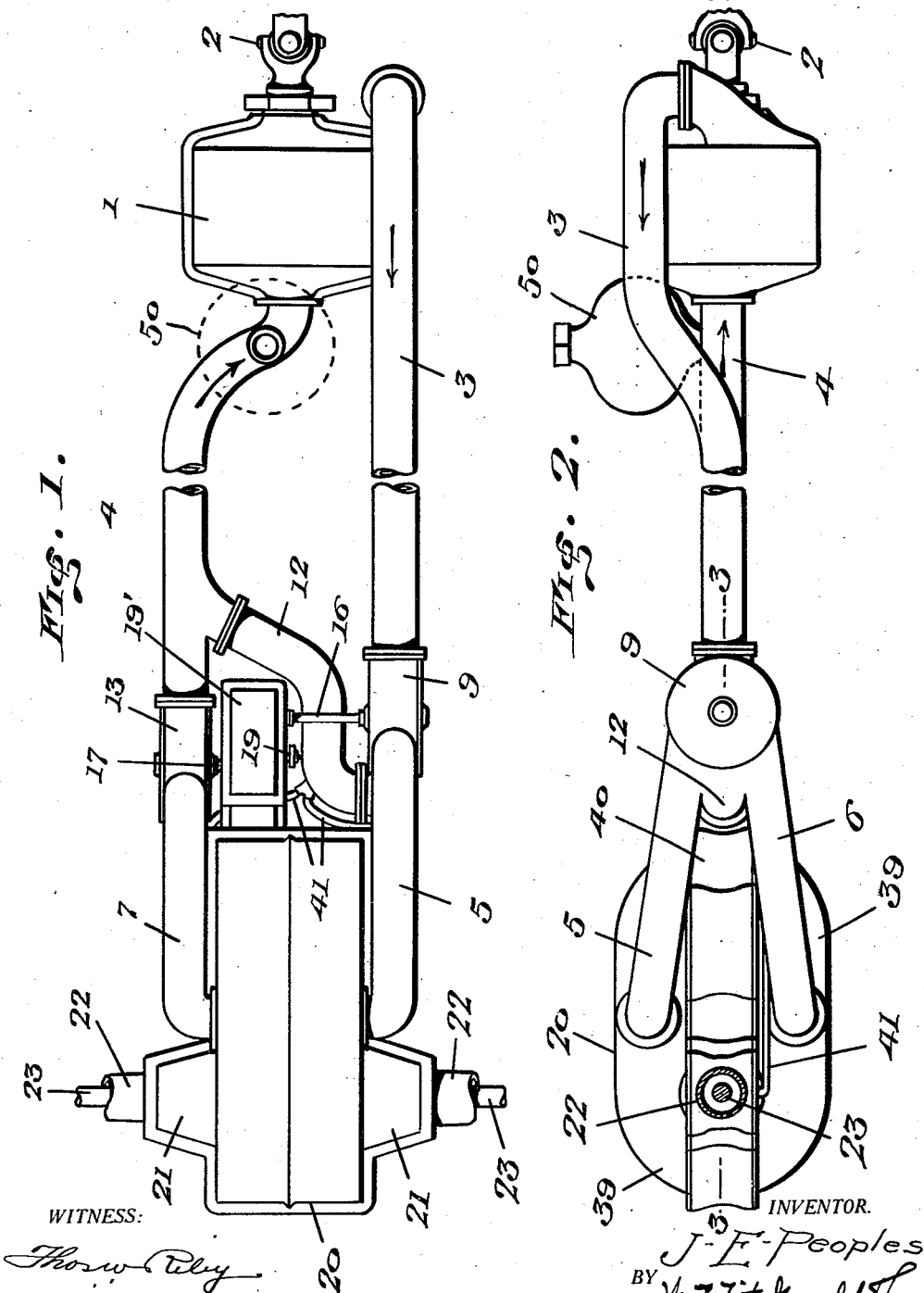

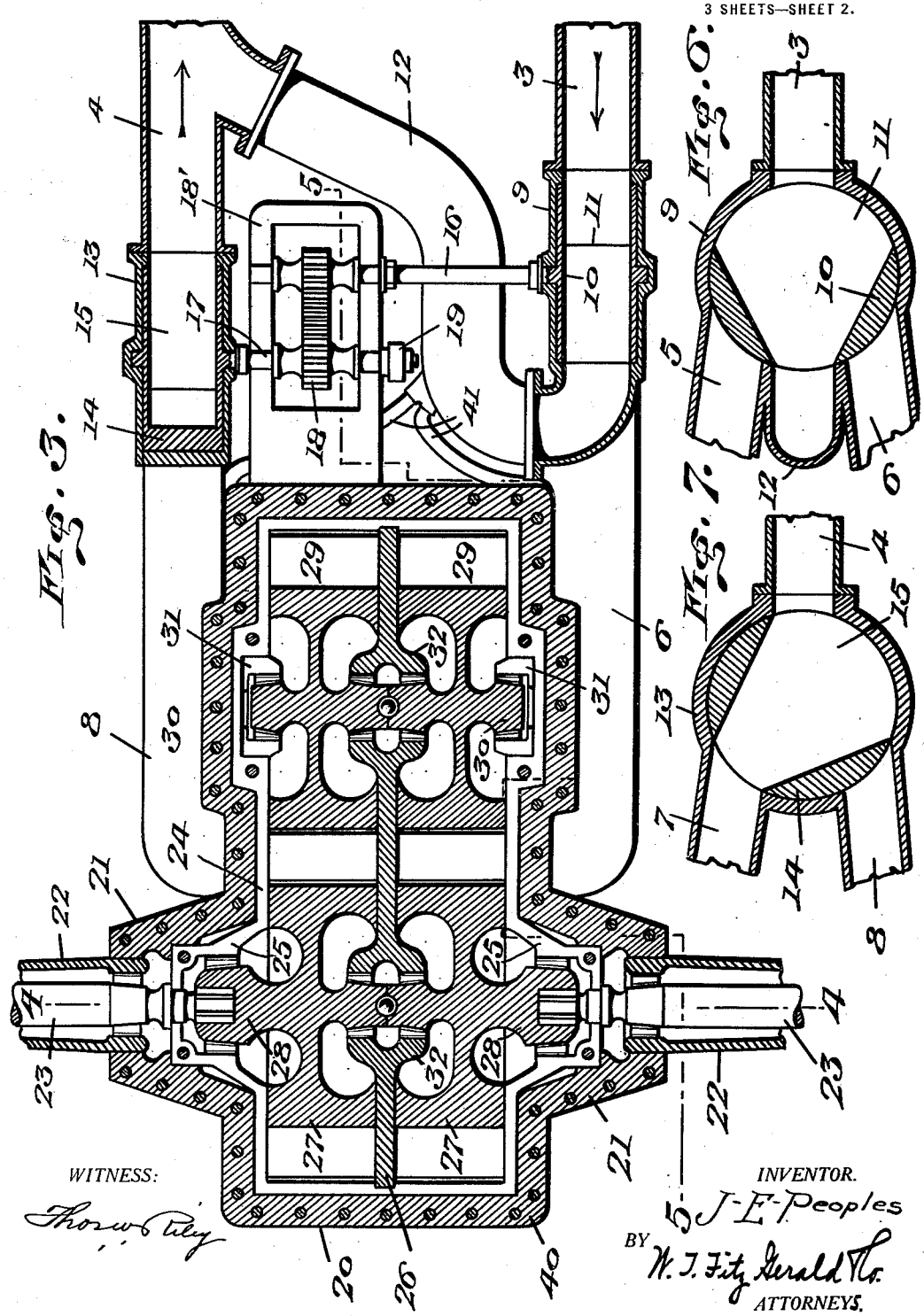

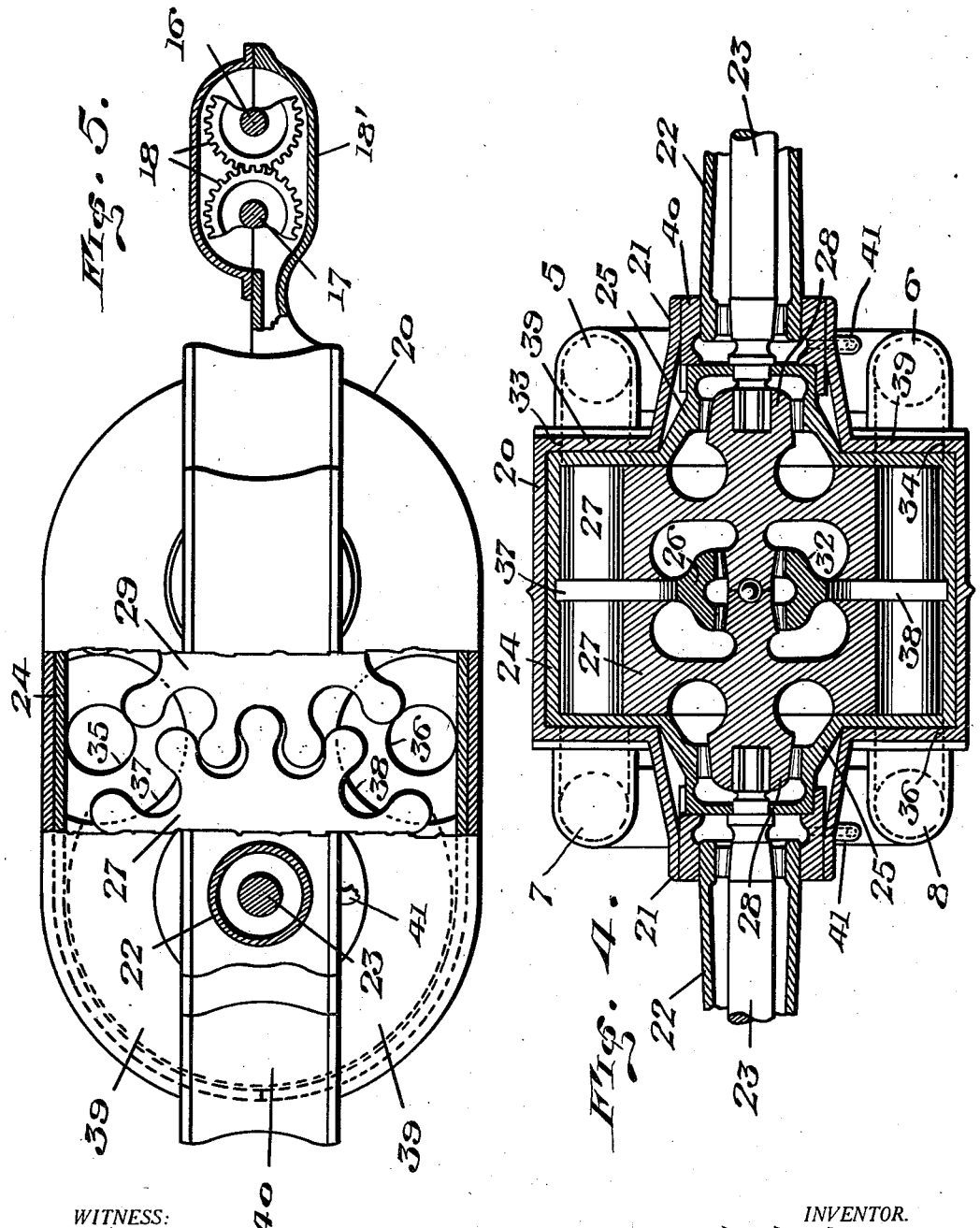

JAMES ELWOOD PEOPLES, OF ALVA, OKLAHOMA.

HYDRAULIC TRANSMISSION.

1,313,415. Specification of Letters Patent. Patented Aug. 19, 1919.

Application filed April 17, 1919. Serial No. 290,732.

*To all whom it may concern:*

Be it known that I, JAMES E. PEOPLES, a citizen of the United States, residing at Alva, in the county of Woods and State of Oklahoma, have invented certain new and useful Improvements in Hydraulic Transmissions; and I do hereby declare the following to be a full, clear, and exact description of the invention, such as will enable others skilled in the art to which it appertains to make and use the same.

The present invention relates to the hydraulic transmission of power, and aims to provide a novel and improved hydraulic transmission apparatus for use on automobiles or other motor vehicles, for transmitting the power from the engine to the propelling wheels or final driven elements, thereby eliminating the transmission and differential gearing ordinarily used and attendant troubles and objections, also dispensing with the requirement for a clutch and fly wheel, as well as affording flexibility, smoothness and efficiency in the operation and control of the machine.

As a more specific object, the invention aims to provide a driving device for the rear axle sections or driven elements, operated by oil or other fluid circulated by means of a suitable pump driven by the internal combustion engine, said device constituting a novel construction and assemblage of component elements whereby the axle sections will be driven with a differential action and in order that the speed can be controlled and the direction of propulsion reversed at the will of the operator.

A further object is the provision of such a device embodying fluid-driven rotors mounted in a novel manner within a casing through which the fluid is circulated, and novel connection of the fluid circulating pipes with the casing and novel means for controlling the circulation of fluid, in order that the driven elements can be rotated in either direction at different speeds, and can be brought to a standstill.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a plan view of the transmission apparatus.

Fig. 2 is a side elevation thereof.

Fig. 3 is an enlarged longitudinal horizontal section taken on the line 3—3 of Fig. 2.

Fig. 4 is a vertical section taken on the line 4—4 of Fig. 3.

Fig. 5 is a section taken on the line 5—5 of Fig. 3, portions being shown in side elevation.

Figs. 6 and 7 are sectional views of the controlling valves.

In carrying out the invention, there is provided a force pump 1 operable by centrifugal force or otherwise for circulating the oil or liquid, and connected, as at 2, directly with the crank shaft of the internal combustion engine of the motor vehicle, the usual transmission gearing, clutch, fly wheel and corresponding parts being eliminated, although a clutch can be used for freeing the engine if this is desired. The pump 1 forces the fluid or liquid into and through a delivery pipe 3, and the liquid circulates back to the pump through the return pipe 4. In a motor vehicle, the pump 1 is in rear of the engine, and the pipes 3 and 4 extend rearwardly from the pump to the driving device which is associated with the rear axle.

In order to provide for the reversing of the machine, the rear end of the pipe 3 has the diverging branches 5 and 6, while the pipe 4 is similarly provided with the diverging branches 7 and 8, and controlling valves are located at the junctures of the branches with the pipes 3 and 4. Thus, a valve casing 9 is provided at the juncture of the branches 5 and 6 and delivery pipe 3, and a valve member 10 is rotatable in said casing and is provided with a passage 11 that is in continual communication with the pipe 3 and which is adapted to be brought into registration with either the branch 5 or branch 6. A by-pass pipe 12 is connected to the casing 9 within the clutch between the branches 5 and 6 and extends across and is connected to the return pipe 4 in rear of the other controlling valve, so that the liquid can shunt across the pipes 3 and 4 and return to the pump, when the passage 11 is in communication with the pipe 12, as seen in Fig. 6. This provides a short circuit for the liquid when idling, it being noted that the valve member 10 can be turned to deliver the liquid into either of the branches 5 or 6 or into the by-pass pipe 12, or the valve member can be set to divide the liquid into either branch and said pipe. The other valve includes a valve casing 13 at the juncture of the branches 7 and 8 and return pipe 4, and a valve member 14 rotatable in the casing 13 and having a passage 15 continually communicating with the pipe 4 and adapted to be brought into registration with either the branch 7 or the branch 8, one branch being closed when the other is opened, the same as with the valve above described.

The two controlling valves are operatively connected to be operated simultaneously, and for this purpose, the valve members 10 and 14 have the stems 16 and 17, respectively, projecting from their inner sides in overlapped relation and entering a casing or housing 18', and gear segments 18 are secured on said stems and mesh with one another, so that the valve members rotate in reverse directions simultaneously. Therefore, when the pipe 3 is brought into communication with the upper branch 5, the valve member 14 is turned to bring the lower branch 8 into communication with the pipe 4, and vice versa. The stem 17 has an operating lever 19 that can be connected in any suitable manner to a handle (not shown) for controlling the vehicle.

The driving device includes a casing 20 provided at opposite sides with outstanding bosses 21 to which the adjacent ends of the axle housing sections 22 are secured, and the axle sections or driven shafts 23 extend from within the housing sections 22 into the bosses 21. The casing 20 has a metallic lining 24 also provided with outstanding bosses 25 at opposite sides entering the bosses 21, and a vertical longitudinal partition 26 is fitted within the lining 24 and divides the interior of the casing into two longitudinal chambers or compartments. Rotors 27 are disposed within these compartments and work snugly against the partition 26 and sides of the lining 24, and the outer ends of the hubs 28 of the rotors 27 project within the bosses 25 and have engaged therein, the adjacent ends of the axle sections or shafts 23. The rotors 27 in being rotated will rotate the axle sections 23 with them. Supplementary or secondary rotors 29 are also disposed in the compartments of the casing 20 between the partition 26 and opposite sides of the casing, and the outer ends of the hubs 30 of the rotors 29 project within recesses 31 in the opposite sides of the lining 24. The adjacent ends of the hubs of the rotors 27 and 29, project within bosses 32 with which the partition 20 is provided, and antifrictional rollers are preferably disposed between the hubs of the rotors and the portions in which they are mounted, as seen in Figs. 3 and 4. The rotors are of gear formation so that the two pairs of rotors at the opposite sides of the partition 26 are in mesh, that is, the rotors of each pair mesh with one another. These rotors are driven by the liquid flowing around the rotors of each pair.

In order to provide for the flow of liquid into and out of the casing 20, it is provided at one side with liquid inlet ports 33 and 34 above and below the points where the rotors mesh, while the opposite side of the casing is provided with liquid outlet ports 35 and 36 opposite and alining with the ports 33 and 34, respectively, above and below the points where the rotors mesh. The branches 5, 6, 7 and 8 are connected to the casing in communication with the respective ports 33, 34, 35 and 36, and the partition 26 is provided with openings 37 and 38 above and below, respectively, the points where the rotors mesh, to permit the liquid to pass from one compartment of the casing to the other below and above the rotors.

It is desirable to construct the casing 20 of opposite cap-shaped sections 39 with an open frame section 40 between them, the section 40 containing the bearings for the rotors, whereby the sections 39 can be removed for purpose of inspection or repair, without dislodging the working parts.

Tubes 41 are connected to the by-pass pipe 12 and extend to and are connected with the bosses 21 in communication with the chambers therein between the bosses 25 and housing sections 22, to permit the liquid to flow into and out of said chambers.

During the operation of the engine, the pump 1 is driven and will force the circulation of the liquid through the pipe 3, and the direction and speed of movement of the vehicle is controlled by the operation of the valve lever 19. In neutral position, the valve member 10 is in the position illustrated in Fig. 6, thereby establishing communication between the pipes 3 and 12, and closing the branches 5 and 6, so that the liquid will flow from the pipe 3 across through the by-pass pipe 12 to the return pipe 4, thus establishing a short circuit of low resistance, through which the liquid can flow with the driving device at the rear at a standstill and the pump 1 continuing to operate. To start the movement of the vehicle in one direction, the lever 19 is moved to bring the passage 11 into communication with the branch 5, while the passage 15 of the other valve will be brought into communication with the branch 8. The pipe 12 will be partially closed, so that the liquid will divide, part flowing to the pipe 12 and part through the branch 5 and through the inlet port 33 into the upper portion of the casing 20. The liquid can flow from one compartment of said chamber to the other through the opening 37 of the partition 26, so as to pass above both pairs of rotors, and the pressure of the liquid will move the opposite portions of the rotors upwardly, thereby rotating the rotors 27 and axle sections 23 in one direction. The liquid in the casing 20 below the rotors can circulate through the opening 38, and will pass out through the port 36 into the branch 8 and then through the passage 15 into the return pipe 4, thus completing the circuit through the driving device. The farther the valve members 10 and 14 are moved into registration with the branches 5 and 8, the greater will be the flow through the driving device casing 20, thus increasing the power transmitted to the axle sections or shafts 23, and the speed is thus controlled. When the valve member 10 is moved to gradually close the branch 5, the passage 11 is brought more and more into registration with the pipe 12, thus permitting the liquid to gradually flow in larger streams through the by-pass pipe 12. By reversing the valves, so that the passage 11 communicates with the branch 6, while the passage 15 communicates with the branch 7, the direction of propulsion is reversed, it being noted that the liquid will enter the casing 20 through the port 34 below the rotors, and will flow upwardly around the rotors, thus driving them in the opposite direction. The liquid will flow out through the port 35 and branch 7 back into the return pipe 4.

It will be noted that when the vehicle is turning corners, so that one axle section 23 rotates faster than the other, a greater amount of the liquid can pass around the respective pair of rotors which rotate the fastest, thus providing and permitting a differential action, because the rotors at the opposite sides of the partition 26 can rotate at different speeds, the liquid flowing through the two compartments according to the requirements.

The present apparatus provides for smooth operation, and elasticity and flexibility in control, the vehicle being readily started and stopped, reversed, and increased or decreased in speed, simply by the movement of the lever 19. Shocks and jars are avoided because the acceleration and slowing down of the motion is gradual and cushioned.

A reserve oil reservoir 50 is preferably provided on the pipe 4 for keeping the pipes full and allowing for fluctuations and expansion and contraction.

Having thus described the invention, what is claimed as new is:—

1. A hydraulic transmission apparatus embodying a liquid pump, delivery and return pipes connected thereto, and each having branches, a liquid operated reversible driving device located between and connected to said branches, controlling valves between said pipes and their branches, and a by-pass pipe connecting the delivery and return pipes and controlled by the valve of the delivery pipe.

2. A hydraulic transmission apparatus embodying a pump, delivery and return pipes connected thereto, a reversible liquid operated driving device, the delivery pipe having a pair of connections with said device to deliver liquid thereinto for operating it in reverse directions, the return pipe having connections with such device to receive the liquid in either direction, a by-pass pipe connecting said delivery and return pipes, and controlling means between said delivery pipe and its connections with said device and the by-pass pipe to control the flow of liquid through said connections and by-pass pipe.

3. A hydraulic transmission apparatus embodying a pump, delivery and return pipes connected thereto, the delivery pipe having branches, a by-pass pipe connecting the delivery and return pipes, a liquid operated driving device between and connected to said branches and return pipe and operable in reverse directions by the flow of liquid from the different branches, and a controlling valve between the delivery pipe and said branches and by-pass pipe for controlling the flow of liquid into either branch and by-pass pipe.

4. A hydraulic transmission apparatus embodying a pump, delivery and return pipes connected thereto, and each having branches and a valve casing between the pipe and branches, a rotor casing between and connected to said branches for the flow of liquid therethrough, rotors within said rotor casing operable in reverse directions by the flow of liquid therethrough from the different branches of the delivery pipe, a by-pass pipe connecting the valve casing of the delivery pipe with the return pipe, valve members within said valve casings, one to control the flow of liquid from the delivery pipe into its branches and by-pass pipe, and the other to control the flow of liquid reversely from the branches of the return pipe to said pipe, and operating means for the valve members to operate them simultaneously and bring the opposite branches into communication with the delivery and return pipes.

5. A hydraulic transmission device embodying a casing having a pair of inlet ports at one side and a pair of outlet ports at the opposite side, rotors working within the casing between said ports, and liquid circulating means communicating with said inlet and outlet ports and having means for establishing the flow through either inlet port and out the diagonally opposite outlet port.

6. A hydraulic transmission device embodying a casing having a pair of inlet ports at one side and a pair of outlet ports at the opposite side, a partition within the casing between the inlet and outlet ports, a pair of rotors having meshing peripheral teeth mounted within the casing at each side of said partition, the meshing portions of said rotors being located between the ports at the opposite sides, and liquid circulating means connected to said inlet and outlet ports and having means for establishing the flow through either inlet port and the diagonally opposite port, said partition having openings for the passage of the liquid at opposite sides of the meshing portions of the rotors.

7. A hydraulic transmission device embodying a casing having a pair of inlet ports at one side and a pair of outlet ports at the opposite side, a partition within the casing between the inlet and outlet ports, a pair of meshing gear rotors within the casing at each side of said partition and having hubs carried for rotation by said partition and sides of the casing, said partition having openings between the opposite inlet and outlet ports, said ports and openings being at opposite sides of the meshing portions of the rotors, driven elements connected to the rotors through the opposite sides of the casing, and liquid circulating means connected to the casing in communication with said ports and having means for establishing the flow through either inlet port and out the diagonally opposite outlet port.

In testimony whereof I have signed my name to this specification in the presence of two subscribing witnesses.

JAMES ELWOOD PEOPLES.

Witnesses:
  DAN SCHWIEGER,
  NORA E. HURT.